G. W. MALCOLM & F. T. MUNTON.
TREATMENT OF BRINE.
APPLICATION FILED MAR. 25, 1910.
1,012,387.
Patented Dec. 19, 1911.
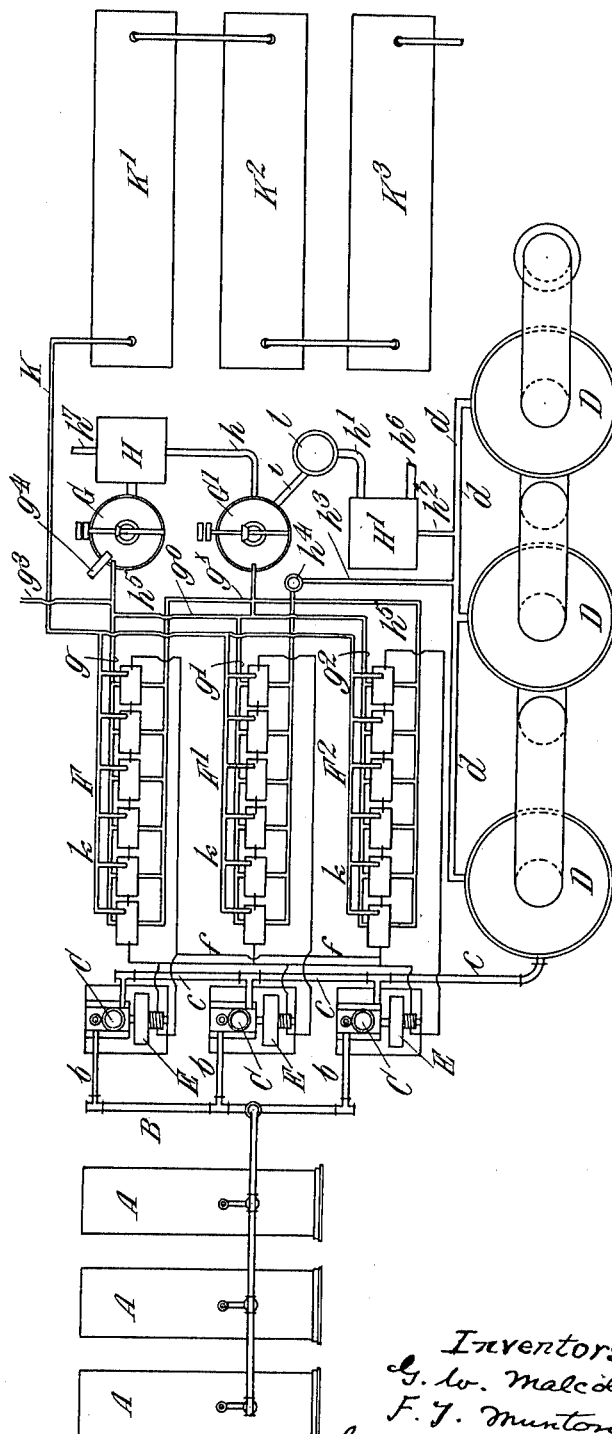

UNITED STATES PATENT OFFICE.

GEORGE WILLIAM MALCOLM, OF DAVENHAM, AND FREDERICK THOMAS MUNTON, OF WINSFORD, ENGLAND.

TREATMENT OF BRINE.

1,012,387. Specification of Letters Patent. Patented Dec. 19, 1911.

Application filed March 25, 1910. Serial No. 551,484.

*To all whom it may concern:*

Be it known that we, GEORGE WILLIAM MALCOLM and FREDERICK THOMAS MUNTON, both subjects of the King of Great Britain, residing, respectively, at Davenham, in the county of Chester, England, and The Oak House, Winsford, in the county of Chester, England, have invented certain new and useful Improvements in or Relating to the Treatment of Brine, of which the following is a specification.

This invention relates to the manufacture of salt from natural brine by the vacuum process of evaporation and has particular reference to a process in which the calcium and magnesium salts are removed before evaporation of the brine, the chief object being to provide for the more economic production of the salt and to effect the recovery of certain of the by products separately for use in the arts.

According to the present invention the brine to be evaporated is rendered alkaline by mixing an alkaline solution therewith. The mixture thus obtained is filtered or decanted and the clear liquor mixed with a further quantity of the electrolyzed brine, then carbonated by means of gases containing carbon dioxid and again filtered or decanted. The resultant liquor is then passed to the evaporating pans for final treatment.

The alkaline solution may be obtained by treating a portion of the raw brine electrolytically. The power for driving the engines for working the dyamos employed in generating the current for use in the electrolyzing step above referred to is derived from the steam, which at present is used for evaporating purposes only and to a small extent for driving the air and other pumps which are indispensable accessories to a vacuum plant, and the exhaust from such engines, which may be superheated, is passed directly to the vacuum plant to furnish the heat necessary for effecting the evaporation of the brine.

In order that the said invention may be clearly understood and readily carried into effect, we will proceed to describe the same more fully with reference to the accompanying drawing in which we have represented diagrammatically a plant adapted to accomplish the manufacture of salt according to this invention.

In the plant illustrated in this drawing, A, A, A, are steam generators for producing high pressure steam which passes, by way of the pipe B and branch pipes $b$, $b$, $b$, to the respective non-condensing engines C, C, C, the exhaust steam from these engines being conveyed by a pipe $c$ to the evaporating pans D, D, D. The engines C, C, C, are arranged to drive electric generators E, E, E, whereby electric current is supplied to electrolyzing cells of any suitable type such as F, F', F². The electric generators will be available for supplying current for lighting and other uses and the excess of current will be available in the above connection or for obtaining calcium carbid or other chemicals; the chlorin from the electrolytic cells may be used for making carbon tetrachlorid, chloroform or any chlorinated article of commerce. The excess of caustic soda solution may be taken off and placed on the market either as a solution or in solid form after being subjected to evaporation. The current is conducted to the cells by way of the leads $f$ $f$ the arrangement of these leads admitting of the connection of any one of the dynamos with any series of cells. Brine is supplied to the cells by hand or by any other convenient means and is electrolyzed therein, caustic soda being produced. It will be seen on reference to the diagram that the cells F are in communication, by way of a pipe $g$ with a mixing apparatus G while the cells F' and F² are in communication with another mixing apparatus G' by way of the pipes $g'$ $g^2$ and a branch pipe $g^x$ which is common to both the pipes $g'$ $g^2$ the latter pipes being also connected with the pipe $g$ by means of the pipe $g^0$. Raw brine is introduced into the mixer G at the same time that the electrolyzed brine from the cells F or alkaline solution is admitted. Any excess of caustic soda after supplying the requisite quantity to the mixer G or mixers G G' may be drawn off by way of the pipe $g^3$ and thereby rendered available for the market as hereinbefore mentioned, only so much as may be necessary to combine with the magnesium salts in the raw brine being introduced into the mixer G. The quantity admitted is regulated by suitable valves or cocks, as will be readily understood, according to the flow of the raw brine into the mixing apparatus. The caustic soda solution conducted to the raw mixing apparatus G is mixed with the raw brine admitted thereto by way of the pipe or feed chute $g^4$ with the result that the magnesium salts are thrown down. The raw brine may conveniently be heated before its admission to the mixing apparatus say to about 120° Fahr., or 160° Fahr., with the object of expediting reaction and assisting the precipitate to settle out. The mixed brine containing a precipitate of Mg (OH)$_2$ now passes to a separator H of any suitable construction in which the aforesaid precipitate is separated out and from which it can be recovered or extracted for subsequent treatment and for being placed on the market as magnesium carbonate by treatment with carbonic acid. The partially treated brine is conducted from the said separator H by way of the pipe $h$ to the mixer G' into which caustic soda solution is admitted from the cells F' F$^2$ and added to the said partially purified brine from the separator H in proportion necessary to combine with the calcium salts of the partially purified brine. This mixture is conducted from the mixer G' by the pipe $i$ to the carbonator I. While in this carbonator washed flue gases are blown through the mixture with the result that the calcium salts are precipitated as calcium carbonate. The mixture containing this precipitate is then caused to pass by way of the pipe $h'$ into a further separator H' where the said calcium carbonate is separated. The brine thus purified and freed from magnesium and calcium salts is now conducted by way of the pipe $h^2$ to the distributing pape $d$ and thence to the evaporating pans D for the production of salt in the well known manner of vacuum evaporation. A small part of the purified brine is conducted back to the cells by way of the pipe $h^3$ pump $h^4$ and distributing pipe $h^5$ for electrolysis, thus enabling brine free from magnesium and calcium salts to be used in the cells. The calcium carbonate may be drawn off from the separator H' through the pipe $h^6$ and the magnesium compounds may be drawn off from the separator H through the pipe $h^7$, or by other suitable means. The chlorin which results from the electroylsis of the brine in the cells F, F' F$^2$ may be collected by the pipes $k$ and conducted by way of the pipe K to the chlorinating chambers K' K$^2$ K$^3$ where bleaching powder may be manufactured in the well known manner by absorbing the chlorin by means of lime.

It will be seen that, after the preliminary electrolysis of the brine, adapted to secure the desired alkalinity, by the hereinbefore described further treatment, suitable for the purpose, the magnesium precipitate is effectually separated from the brine and rendered available for treatment by any convenient means whereby the same may be converted into a commercial article. Further, that, by the action of the flue gases from the steam generators, the gases being passed through the further treated and partially purified brine, the carbon dioxid in the said gases combines with the caustic soda forming sodium carbonate, calcium carbonate is precipitated and the equivalent of sodium sulfate left in the brine solution. This latter will be found quite harmless from the point of view of evaporation and, moreover, will be present in quite a negligible quantity. As a by-product bleaching powder is produced by the use of the saturating chambers wherein the absorption by lime of the chlorin evolved from the electrolytic process is accomplished. The cycle of operations is, therefore, by means of the steam, to first drive the engines and the current generating plant; the exhaust steam from the engines is passed by means of pipes or other conduits to the vacuum plant where it effects the evaporation and the making of the salt from the previously electrolyzed and purified brine, which is led into the evaporating pans. The resultant by products are treated in any known manner to convert or render the same into commercial commodities for use in the arts. Thus the process may be carried on continuously and with great economy and profit.

By the various steps in the above described electrolysis, the magnesium and the calcium salts are effectually separated in the pure state as they are thrown down in different periods of the process.

What we claim and desire to secure by Letters Patent of the United States is:—

1. The herein described method of manufacturing salt from natural brine by the vacuum process of evaporation, consisting in subjecting brine to treatment in an electrolytic cell, mixing the resulting partially electrolyzed brine with raw brine so as to combine with the magnesium salts in the brine and precipitate the same, treating the mixture for effecting the separation of the magnesium precipitate, mixing the partially purified brine with a further quantity of the partially electrolyzed brine, passing gases containing carbon dioxid through the brine for obtaining sodium carbonate and calcium carbonate and the precipitation of the latter and then evaporating the purified brine.

2. In the herein described method of manufacturing salt from natural brine by the vacuum process of evaporation, subjecting brine to treatment in an electrolytic cell, mixing the partially electrolyzed brine with heated raw brine so as to combine with the magnesium salts in the brine and precipitate the same, treating the mixture for effecting the separation of the magnesium precipitate, mixing the partially purified brine with a further quantity of the partially electrolyzed brine, passing gases containing carbon dioxid through the brine to form sodium and calcium carbonate and obtain the precipitation of the latter and then conducting the purified brine to evaporating pans heated by steam.

3. In the herein described method of manufacturing salt from natural brine by the vacuum process of evaporation, subjecting brine to treatment in an electrolytic cell, mixing the partially electrolyzed brine thus obtained with raw brine, treating the mixture for effecting the separation of the magnesium precipitate, conducting a portion of the partially purified brine back to the electrolytic cells, mixing the remaining portion of the partially purified brine with a further quantity of the partially electrolyzed brine or alkaline solution, passing gases containing carbon dioxid through the brine to form sodium carbonate, and obtain the precipitation of the calcium carbonate and then conducting the purified brine to evaporating pans heated by steam.

In testimony whereof we affix our signatures in presence of two witnesses.

GEORGE WILLIAM MALCOLM.
FREDERICK THOMAS MUNTON

Witnesses:
H. BOWMAN,
RICHARD H. PHILLIPS.

---

Copies of this patent may be obtained for five cents each, by addressing the "Commissioner of Patents, Washington, D. C."